United States Patent [19]

Chiuminatta et al.

[11] Patent Number: 4,903,680

[45] Date of Patent: Feb. 27, 1990

[54] SKID PLATE FOR CONCRETE SAW

[76] Inventors: Edward Chiuminatta, 16405 Evrett; Alan R. Chiuminatta, 18525 Wood Rd., both of Riverside, Calif. 92504

[21] Appl. No.: 244,939

[22] Filed: Sep. 15, 1988

[51] Int. Cl.[4] .......... B28D 1/04

[52] U.S. Cl. .......... 125/13 R; 30/373

[58] Field of Search .......... 125/13 R; 30/373, 374, 30/377; 404/89, 93; 425/136, 142, 298, 385; 83/875, 878

[56] References Cited

U.S. PATENT DOCUMENTS 2,996,089 8/1961 McCarty .......... 30/374

4,769,201 9/1988 Chiuminatta et al. .......... 404/89 X

OTHER PUBLICATIONS

Marks Standard Handbook for Mechanical Engineers, p. 6-150, pp. 5, "Properties".

*Primary Examiner*—Frederick R. Schmidt

*Assistant Examiner*—M. Rachuba

*Attorney, Agent, or Firm*—Knobbe, Martens, Olson & Bear

[57] ABSTRACT

A removal skid plate for use on a saw for cutting wet concrete. The portion of the skid plate in contact with the concrete has a slot therein through which a rotating cutting blade extends to cut a groove in the concrete. At a leading, cutting edge of the slot, a ceramic insert is placed in the skid plate to inhibit wear adjacent the cutting edge of the blade. The insert is removable and held by a resilient means which can vary the force exerted between the insert and the concrete surface being cut in order to minimize any undesirable markings which the insert might exert on the concrete surface.

43 Claims, 2 Drawing Sheets

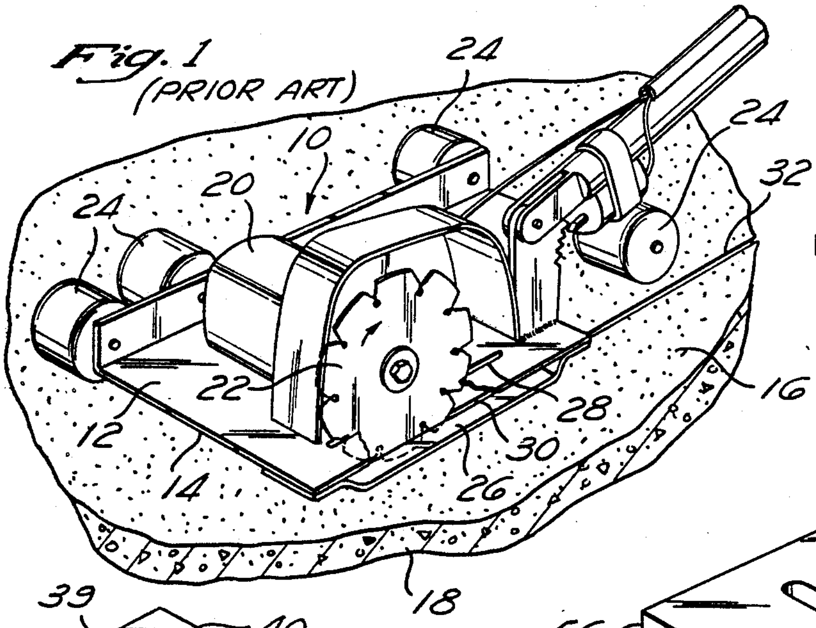
Fig. 1 (PRIOR ART)
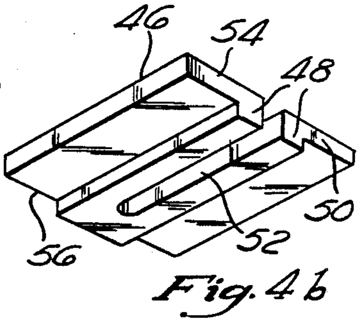
Fig. 4b
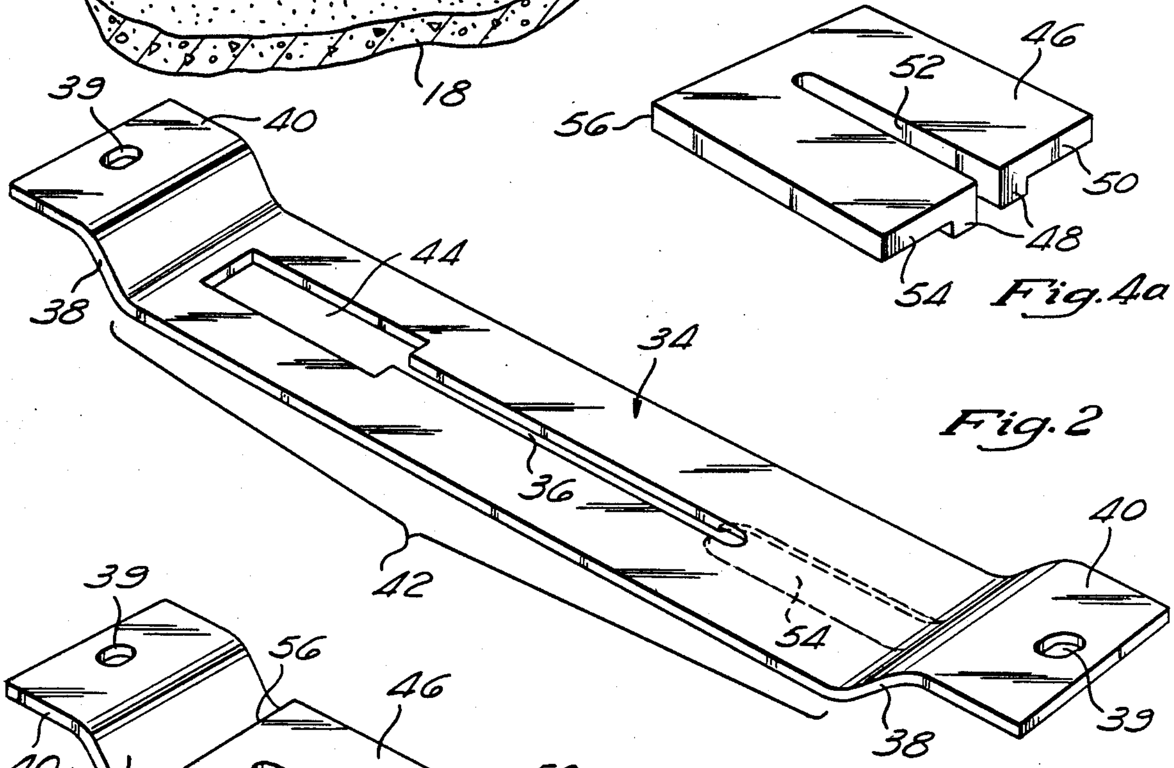
Fig. 4a
Fig. 2
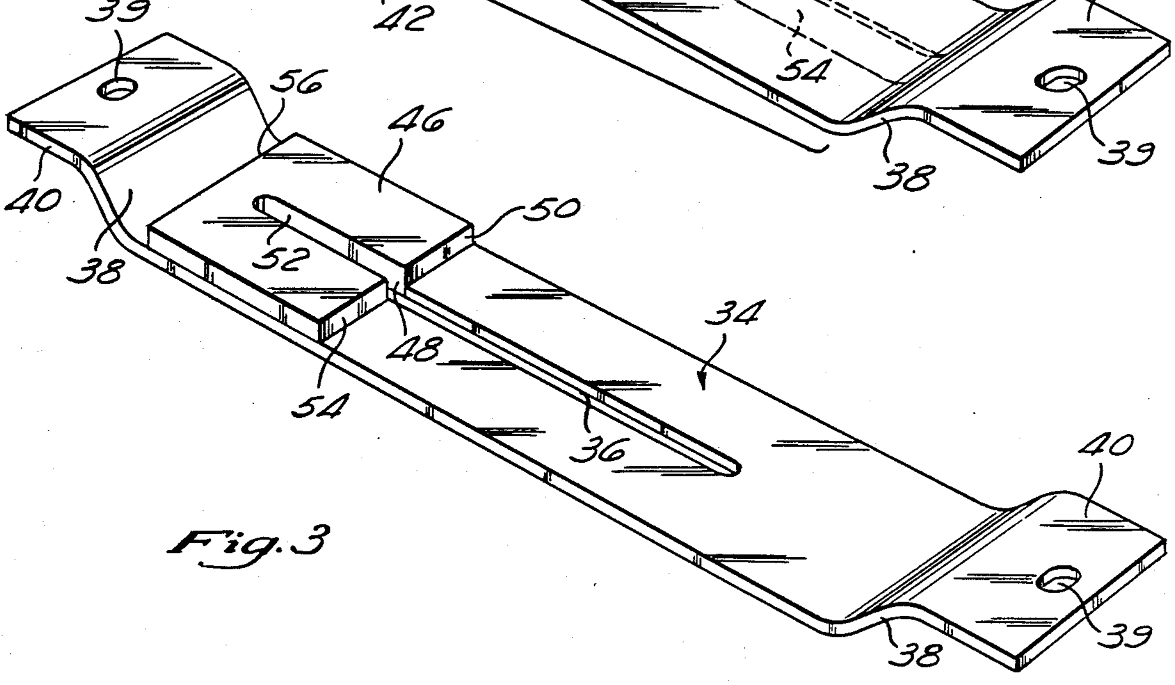
Fig. 3

SKID PLATE FOR CONCRETE SAW

BACKGROUND OF THE INVENTION

This invention relates to saws for cutting concrete before the concrete has hardened sufficiently so that it may be satisfactorily cut with conventional water-lubricated diamond-impregnated abrasive saws.

Concrete is a combination of a hydraulic cementing substance, aggregate, water, and often other substances that are added to impart specific properties to the concrete. When concrete is poured, it is typically in a watery or flowing state which allows the concrete to be spread evenly over floors and further allows varying surface finishes to be placed on the concrete after the concrete has been leveled or shaped to a desired configuration. After a period of time, varying with the mixture of concrete, the temperature, and the moisture availability, the concrete attains a workable plasticity which permits the surface of the concrete to be formed and to retain a finish.

After the concrete is finished, it is allowed to stand for an additional period of time during which the concrete cures to obtain its well known, rock-like hardness. The curing or setting time depends on the moisture available, the temperature, and the specific additives added to the concrete to affect the curing time. As the concrete cures, it undergoes thermal stresses which cause the concrete to expand and contract in various manners depending on the shape and thickness of the concrete, and the type of concrete. These thermal stresses can cause cracking.

It is common practice to provide grooves at predetermined intervals in the concrete so that any cracks in the concrete will form at these grooves rather than in the remainder of the concrete. These grooves are typically cut in the surface of the concrete by use of a heavy, high powered, rotating abrasive saw blade. The cutting blade is typically made of a diamond abrasive material and is provided with a liquid coolant and lubricant to facilitate cutting the hardened concrete.

Cutting by these conventional abrasive saws typically occurs the "next day" after the concrete has been poured in order to allow the concrete to reach a sufficient hardness so that the weight of the machine and operator will not unduly damage the concrete surface during cutting, and to prevent the water lubricant and saw blade action from causing undue damage to the finish on the concrete surface.

As described in U.S. patent application Ser. No. 843,779, filed Mar. 25, 1986, a concrete saw has been designed to allow cutting of the concrete while the concrete is still wet or soft, and before the concrete has hardened sufficiently to allow cutting by conventional methods such as the abrasive saws described above. The contents of that patent are incorporated herein by reference.

That wet concrete saw uses a combination of rollers and a skid plate to support the weight of the saw on the concrete surface during cutting. The skid plate has a slot therein through which a rotating cutting blade extends in order to cut the concrete surface. As described in that patent application, the spacing between the cutting blade and the adjacent edges of the slot in the skid plate affect the quality of the groove cut in the concrete.

It has been found that during operation, the portion of the skid plate immediately adjacent the cutting edge of the rotating cutting blade wears away much faster than the remaining portion of the skid plate. The result is a widening of the slot adjacent the cutting edge of the blade. As the width of the slot in the skid plate increases, the quality of the cut in the concrete decreases. There is, thus, a need for a means to control deterioration of the skid plate during cutting.

SUMMARY OF THE INVENTION

A skid plate is provided for a saw that is used to cut grooves in unhardened concrete with a rotating cutting blade having a predetermined thickness. The skid plate has a leading end, and opposite thereto, a trailing end. There is a slot in the skid plate through which the rotating cutting blade can extend, the sot extending from adjacent the leading end toward the trailing end. The slot is sized so there is a space of less than 3/16 of an inch between the sides of the cutting blade, and the adjacent sides of the slot. The skid plate has an aperture at the end of the slot nearest the leading edge.

An insert made of a wear resistant material, such as ceramic, is inserted into the aperture. The insert has a slot therein the location of which corresponds to the slot in the skid plate when the insert is inserted into the aperture, so as to provide a continuation of the slot in the skid plate. The insert is positioned in the skid plate so that a cutting edge of the cutting blade passes through the slot in the insert during cutting of the concrete.

Also provided are means for retaining the insert in the aperture as the cutting blade passes through the slot in the insert during operation of the saw. Preferably, the insert is removably insertable into the aperture, and the retaining means removably retains the insert in the aperture.

The retaining means advantageously comprises means on the saw, cooperating with the insert, for retaining the insert in the aperture. In a further variation, the retaining means further comprises variable resistance means for varying the force with which the insert is held against the concrete in order to affect the marks the insert leaves on the surface of the concrete being cut.

In a further embodiment of this invention, the skid plate contains a recessed area in the bottom surface of the skid plate, the recessed area joining at least the end of the slot in the skid plate at the trailing end thereof, and extending toward the trailing end of the skid plate until the skid plate no longer contacts the concrete. The width and depth of the recessed area are sufficient to prevent the skid plate from troweling over and at least partially closing the groove cut in the concrete by the cutting blade.

The insert itself preferably comprises a ceramic insert having an engaging portion configured to correspond to the shape of the aperture in the skid plate. The insert has a retaining portion attached to the engaging portion. The retaining portion has a shape which does not correspond to the aperture to prevent the insert from passing through the aperture when the engaging portion is placed in the aperture. The insert has a slot in at least the engaging portion, positioned to correspond with at least a portion of the slot in the skid plate when the engaging portion is inserted into the aperture. The slot in the insert advantageously has a width of about 0.125 inch. Advantageously, the slot in the insert has a width such that when a concrete saw blade is inserted into the slot, there is a gap on each side of the saw blade of less than 3/16 of an inch. It is more desirable that the slot in the insert have a width such that when a concrete saw blade is inserted into the slot, there is a gap on each side of the saw blade of less than 3/32 of an inch. Preferably, the slot in the insert has a width such that when a concrete saw blade is inserted into the slot, there is a gap on each side of the saw blade of less than 1/16 of an inch. An insert made from a single piece of ceramic is believed most suitable. A suitable ceramic material is Ceralloy 147-3 ceramic.

DESCRIPTION OF THE DRAWINGS

The present invention will be better understood from the description of the preferred embodiment which is given below, taken in conjunction with the drawings wherein like reference characters or numbers refer to like parts throughout the description, and in which:

FIG. 1 is a perspective view of a prior art saw for cutting unhardened concrete;

FIG. 2 is a perspective view of a skid plate of this invention;

FIG. 3 is a perspective view of a skid plate of this invention with an insert in the skid plate;

FIG. 4*a* is a perspective view of the top side of an insert for a skid plate of this invention;

FIG. 4*b* is a perspective view of the bottom side of an insert for a skid plate of this invention;

DESCRIPTION OF THE PREFERRED EMBODIMENT

Figure 5:
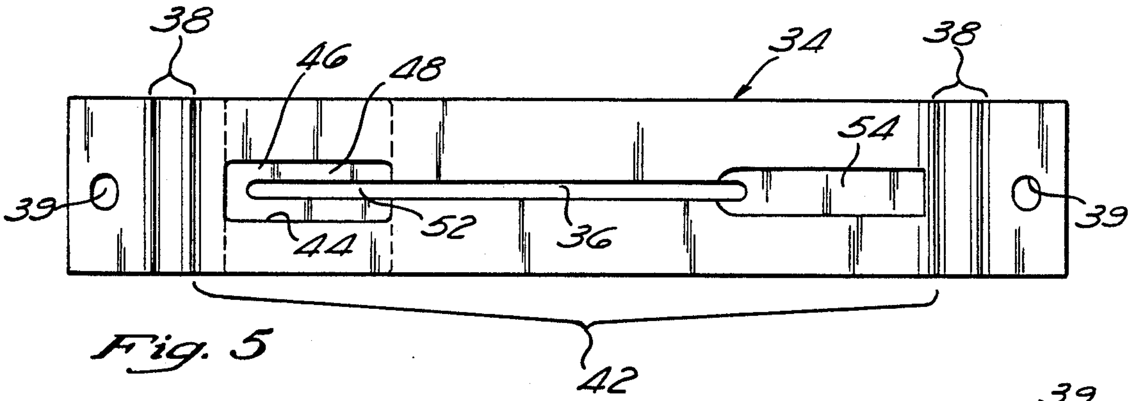
FIG. 5 is a bottom plan view of FIG. 3.

A prior art saw for cutting unhardened concrete is shown in FIG. 1. The wet concrete saw 10 comprises a base plate 12 having a generally rectangular shape. The base plate 12 has a lower surface 14 generally facing the exterior surface 16 of the slab of concrete 18. A motor 20 is mounted on the base plate 12 and is rotatably connected to a cutting blade 22 to cause the blade 22 to cut with an upcut rotation. A plurality of wheels 24 are rotatably connected to the base plate 12. An upcut rotation means the cutting edge of the blade 22 rotates out of the concrete 18 at the leading edge of the blade 22

As used herein, down refers to the direction of the concrete being cut when the saw 10 is setting on the concrete, while "up" refers to the direction away from the concrete begin cut. The cutting blade 22 cuts with an upcut rotation in the direction of travel of the saw 10. The portions of the saw 10 in the direction of the travel as the saw 10 cuts will be referred to as being in the "leading" direction, while the opposite direction is the "trailing" direction.

A skid plate 26 is removably connected to the lower surface 14 of the base plate 12 at the location of the cutting blade 22. The skid plate 26 and wheels 24 support the concrete saw 10 on the exterior surface 16 of the concrete 18. Preferably, the wheels 24 and skid plate 26 provide sufficient area to distribute the weight of the saw 10 sufficiently that the exterior surface 18 of the concrete is not unacceptably marred.

The cutting blade 22 extends through a slot 28 in the base plate 12, and further extends through a slot 30 in the skid plate 26 in order to cut a groove 32 in the concrete 18. The cutting blade 22 floats, in the sense that it is mounted (by means not shown) so that it can move up and down with respect to the surface 16 of the concrete slab 18.

As described in U.S. patent application Ser. No. 843,779, the spacing between the rotating cutting blade 22 and the adjacent sides of the slot 30 greatly affect the quality of the groove 32 cut in the concrete 18. Specifically, the closer the edges of the slot 32 are to the cutting blade 22, the better the quality of the groove. As the space between one side of the cutting blade 22 and the adjacent side of the slot 30 in the skid plate increases, the quality of the groove 32 decreases. A space greater than 3/16 of an inch (0.1875 inch) can result in a groove 32 of unacceptable quality. A space less than 3/32 of an inch (0.09375 inch) provides a groove 32 of improved quality, while a space of less than 1/16 of an inch (0.0625 inch) provides an even better groove 32. Thus, the spacing between the slot 30 and the cutting blade 22 is very important.

Referring to FIG. 2, an improved skid plate 34 is shown, by way of illustration, and not by limitation. The skid plate 34 is made out of a substantially rectangular, flat sheet of metal, having a thickness of about 1/16 of an inch (0.0625 inch), and a width of about 1.5 inches. There are a pair of offset bends 38 adjacent each of the opposing ends of the skid plate 34 in order to form two mounting areas 40 at opposing ends, with a flat, support section 42 in between. The mount areas 40 are substantially parallel to the support area 42, but offset from support area 42 by about one-half of an inch (0.5 inch) by the offset bends 38. The mounting areas 40 have a length of about 0.75 inch, while the support area has a length of about 6.5 inches.

At about the center of each of the mount areas 40 there is an oblong hole 39, with the long axis perpendicular to the direction of travel of the saw. The mount areas 40 provide a mounting area for connection to the base plate 12 (FIG. 6) while the support area 42 provides an area for contacting the surface 16 (FIG. 6) of the concrete in order to support the concrete saw 10 (FIG. 1).

Figure 6:
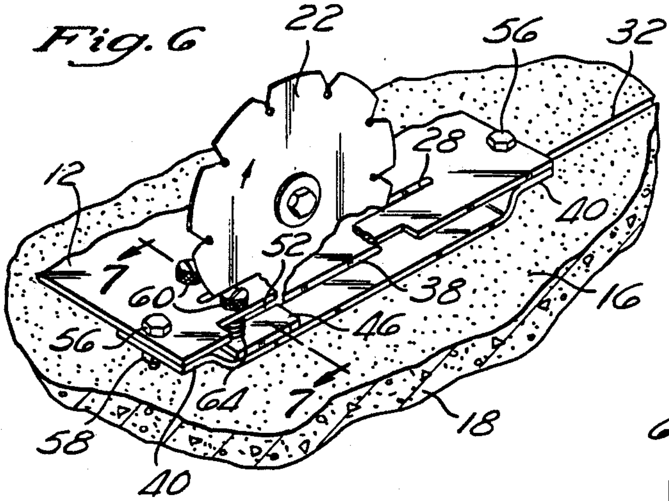
FIG. 6 is a perspective view of a portion of a saw with a skid plate of this invention.

Still referring to FIG. 2, running along the longitudinal axis of the support area 42 is a slot 36 through which the rotating cutting blade 22 (FIG. 6) can extend. The slot 26 is sized to provide a close fit between the sides of the slot and the adjacent sides of the cutting blade 22 (FIG. 6). A slot of about ⅛ of an inch (0.125 inch) may advantageously be used for a blade 22 having a thickness of about 0.095 to 0.083 inch.

At the end of the slot 36 adjacent the leading edge of the skid plate 34, which is adjacent the leading edge or cutting edge of the cutting blade 22, is located a larger aperture 44 having a generally rectangular shape. The apparatus 44 extends through the thickness of support area 42 of skid plate 34. Referring to FIG. 3, an insert 46 is placed on the skid plate 34 with at least a portion of the insert 46 extending into the aperture 44 (FIG. 2).

Referring to FIGS. 4*a* and 4*b*, the lower portion of the insert 46 forms an engaging portion 48 which is configured to correspond to the shape of aperture 44. As used herein, "lower" refers to the portions nearest the concrete during cutting, and "upper" refers to those portions farthest away from the concrete during cutting. The upper portion of insert 46 comprises a retaining portion 50 which is larger than the aperture 44. A slot 52 extends from a trailing edge 54 toward a leading edge 56 of the insert 46, but ends before reaching the leading edge 56.

Referring to FIG. 3, the engaging portion 48 of insert 46 is placed into aperture 44 (FIG. 2), with the retaining portion 50 resting on the top surface of the support area 42 so as to prevent the insert 46 from sliding all the way through the aperture 44. The slot 52 coincides with the location of slot 36. Preferably, the engaging portion 48 substantially fills the aperture 44, but does not extend through the aperture 44 so as to protrude into the concrete surface during cutting. Thus, the bottom of the skid plate 34 which contacts the concrete 18 (FIG. 6) forms a substantially smooth and level surface for contacting the concrete 18. This smooth surface helps minimize marking of the concrete surface as it is being cut.

Figure 5A:
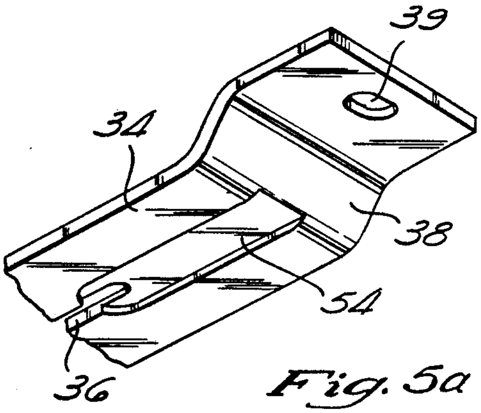
FIG. 5*a* is a bottom perspective view of one end of the skid plate of FIG. 5.

Referring to FIGS. 5 and 5*a*, the bottom of the skid plate 34 is shown. The engaging portion 48 of insert 46 substantially fills the aperture 44. The slot 52 coincides with the location of slot 36 to provide a substantially continuous slot. Advantageously, the slots 52 and 36 can form a continuous slot of a constant width. The slot 36 does not extend for the full length of the support area 42, and does not extend into the offset bend area 38.

At the trailing end of the slot 36 there is located a wider recessed area 54 formed in the bottom surface of the skid plate 34. The recessed area 54 does not extend through the thickness of the skid plate 34, and has its leading edge overlapping with the trailing portion of slot 36. The recessed area 54 in the bottom of the skid plate 34 prevents the trailing portion of the skid plate 34 from contacting the newly cut groove 32 (FIG. 6) when the skid plate 34 is placed against the exterior concrete surface 16 (FIG. 6). The recessed area 54 extends into the bend area 38 so that the trailing edge of recessed area 54 also does not contact the concrete 18 when the skid plate 34 is placed in contact with the exterior surface 16 (FIG. 6) of the concrete 18 (FIG. 6). The recessed area 54 can be cut with an end mill, and a width of about $\frac{3}{8}$ of an inch, at a depth of about 0.045 inch, is believed suitable.

The insert 46 could be permanently fastened to the skid plate 34, as for example by an adhesive. However, replacement of the insert 46 separate from replacing the entire skid plate 34 would then require the worn insert to be broken out, and the edges of aperture 44 to be smoothed out, before a new insert could be used. The illustrated embodiment provides an easier means for removably restraining the insert.

Referring to FIG. 6, the skid plate 34 is shown mounted on the base plate 12 of the saw 10. Two fasteners, such as bolts 56, one each at both the leading and trailing ends of the skid plate 34, removably fasten the skid plate 34 onto the base plate 12. The bolts 56 extend through holes (not shown) in the base plate 12, through corresponding holes 39 (FIG. 2) in the mounting areas 40 (FIG. 2) of skid plate 34, with a nut 58 screwing onto the bolt 56 to complete the attachment.

The use of two bolts 56 at opposite ends of the skid plate 34, in conjunction with the oblong shape of the holes 39, allows the slot 36 in the skid plate 34 to be aligned accurately relative to the rotating cutting blade 22. The oblong holes 39 allow lateral alignment, while the bolts 56 and nuts 58 allow fastening once alignment is achieved. Spacers (not shown) removably inserted between the blade 22 and the sides of the slot 36 allow the blade 22 to be centered in the slot 36, with the spacers being removed before use of the saw 10.

Figure 7:
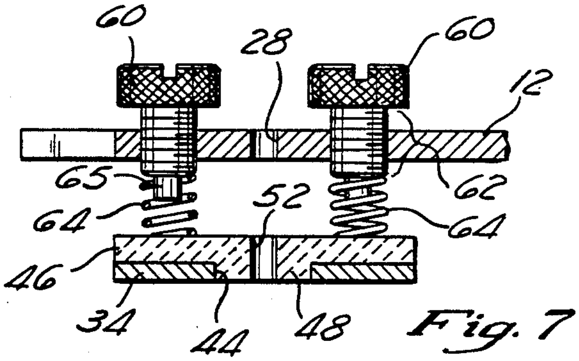
FIG. 7 is a plan sectional view taken along lines 7—7 from FIG. 6.

Referring to FIGS. 6 and 7, two threaded fasteners, such as screws 60, are threaded through the base plate 12 immediately above the location of the insert 46. The screws 60 advantageously have a knurled head sufficiently large to allow tightening by person's fingers, or can alternatively take the form of a thumbscrew. The screws 60 have a threaded shaft 62 which is threaded through holes in the base plate 12, and extends through and beyond the bottom of the base plate 12, but does not contact the insert 46.

Referring to FIG. 7, a compression spring 64 is captivated by each of the screws 60. This captivation may be achieved by having the spring 64 surround the shaft 62 of screws 60 and be compressed against the insert 46. More advantageously, as shown in FIG. 7, screw 60 has a smaller sized tip 65 on the end of screw 60. The spring 64 fits over the tip 65, but not over the screw 60. By varying the amount the screw 60 extends through base plate 12, the compression of the spring 64 can be varied. Varying the compression various the face holding insert 46 against skid plate 34.

Figure 8:
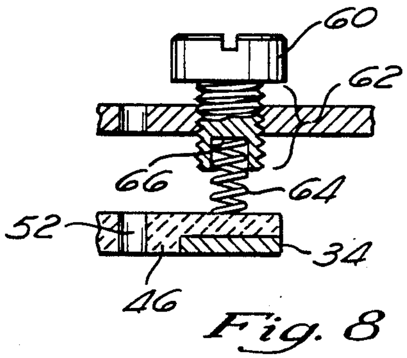
FIG. 8 is a sectional view of an alternate embodiment of a portion of the screw shown in FIG. 7.

In an alternate embodiment shown in FIG. 8, a recess 66 is formed inside the shaft 62 with the spring 64 fitting into that recess. In either case, the springs 64 press against the insert 46 in a downward direction, and resiliently urge the insert 46 to maintain its position during cutting.

The force exerted on the insert 46 must not be too great, or the insert 46 may fracture if it is made of a brittle material like some ceramics. Further, too large of a force between the insert 46 and the base plate 12 will cause the skid plate 34 to bow, and result in unacceptable operation of the saw and unacceptable marking of the concrete surface 16 (FIG. 6).

Figure 9:
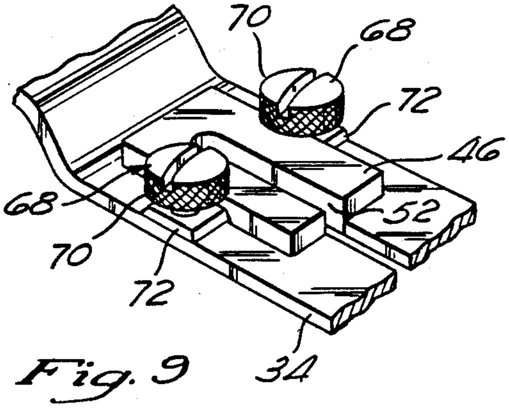
FIG. 9 is a perspective of an alternate embodiment of a means for holding the insert of this invention.

Referring to FIG. 9, an alternate embodiment is shown in which the insert 46 is held onto the skid plate 34 by two threaded fasteners 68, which have wide heads 70 that overlap the sides of insert 46 in order to hold the insert 46 in place. The fasteners 68 are threaded into the skid plate 34. Since the skid plate 34 is relatively thin, bosses 72 are attached to the top of the skid plate 34 to increase the thread area into which the fasteners 68 may be screwed and unscrewed. To replace the insert 46, the fasteners may be unscrewed, and refastened after a replacement insert 46 is inserted. Unfortunately, the space constraints between the skid plate 34 and the bottom portions of the saw are such that it is difficult to easily replace the insert 46 with this alternate embodiment, without removal of the entire skid plate 34.

The function of the improved skid plate will now be described with initial reference to FIG. 6. The skid plate 34 is placed on the concrete surface 16, with the cutting blade 22 extending through the slots 28, 36 and 52 in order to cut a groove 32 in the slab of concrete 16. The cutting blade 22 has an upcut rotation such that the leading or cutting edge of the blade 22 rotates out of the concrete surface 18 in the slot 52 in insert 46.

As the cutting edge of the blade 22 rotates out of the concrete, it tends to carry unhardened concrete with it which acts as a very strong abrasive agent and which causes excessively high wear in the immediately surrounding portions of the skid plate 34. The greatest area of wear extends from the location of the tip of the cutting blade 22 toward the trailing end of the blade, for a length of about $\frac{1}{2}$ of an inch (0.5 inch). This wear length is due in part to the fact that the blade 22 is allowed to float, or move up and own, during cutting.

In order to minimize wear, the insert 46 is made out of a wear resistant material. A thickened area of hardened metal was tested adjacent the cutting edge, but did not provide a noticeable improvement in wear resistance. Thus, while metal might work, it is not preferred. A ceramic material has been found to be able to resist this abrasive to a far greater extent than can a normal metal skid plate. Thus, ceramic is preferred. A ceramic matrix sold under the name "Ceralloy 147-3," made by Ceradyne, Inc. has been found suitable. The insert 46 thus provides a wear resistant means for extending the useful life of the skid plate 34. Further, it provides localized wear means for resisting wear adjacent the cutting edge of the saw blade 22.

When the insert 46 has worn sufficiently that it needs to be replaced, screws 60 can be loosened and the insert 46 replaced, whereupon the screws 60 and springs 64 are retightened in order to restrain the insert 46. There is thus provided a means of replacing the wear resistant insert. The springs 64 pressing against the insert 46 provide a means of holding the insert 46 in place.

The engaging and retaining portions 48, 50, respectively (FIGS. 3, 4) of the insert 46 provide a passive restraint to hold the insert 46 in position during cutting of the concrete. The screws 60 and springs 64 help retain the ceramic insert 46 in position by resiliently urging the insert 46 against the surface of the concrete. There is thus provided means for removably restraining the insert 46.

With use, even the skid plate 34 will wear as it slides over the abrasive concrete surface 16. When the skid plate 34 becomes worn too thin, becomes damaged from hitting obstacles in the concrete, or otherwise needs replacing, the bolts 56 and nuts 58 can be removed and the entire skid plate 34 replaced. There is thus provided a means for removably retaining the skid plate 34.

Referring to FIG. 8, if the springs 64 are placed in the recess 66 in the shaft 62 of screw 60, then by screwing or unscrewing the screw 60 relative to the base plate 12, the force which the springs 64 exert on the insert 46 can be increased or decreased. There is thus provided a variable load means for resiliently urging the insert into position against the concrete. A much stiffer, and less resilient positioning holder can be achieved simply by extending the screws 60 to press against the insert 46. Thus the screws 60 and springs 64 provide a retaining means which can exert a large range of forces for restraining upward and downward movement of the insert 46.

Referring to FIGS. 5 and 6, if a portion of the skid plate 34 contacts the newly cut groove 32, the skid plate will act as a trowel and close the newly cut groove 32. Thus, in the previous patent application Ser. No. 843,779, the slot in the skid plate extended all the way through the skid plate into the area corresponding to the bend area 38 on skid plate 34. Having the slot extend into the bend area 38, however, weakens the skid plate 34.

That weakness can be prevented as shown in FIG. 5, wherein the slot 36 ends in the support area 42, with a recessed area 54 extending on into the bend area 38. The recessed area 54 in the bottom of the skid plate 34 prevents the skid plate 34 from contacting the newly cut groove 32. It also provides a flat, solid metal connection for those portions of the skid plate 34 on opposite sides of the groove 36 in the support area 42. Thus, the support area 42 is stronger, and yet does not close the newly cut groove 32. There is thus advantageously provided a stronger skid plate having a recessed area which does not close or trowel over the newly cut groove in the concrete.

Referring to FIGS. 3, **4*a* and 4*b*, in the illustrated embodiment the insert 46 is made of an abrasive resistant material such as ceramic. The ceramic insert 46 can advantageously formed in to a single, integral piece. An insert 46, having a retaining portion 50 about 1.5 inches long and 1 inch wide, with an engaging portion 48 about 1.5 inches long and 0.5 inch wide, is believed to be suitable. A ⅛ inch thickness of the retaining portion 50 has been found suitable, with the thickness of the engaging portion 48 corresponding to the thickness of the skid plate 34 (FIG. 3) so as to provide a substantially smooth contacting surface with the concrete surface 18 (FIG. 6). Since the aperture 44 advantageously has a shape corresponding to that of the engaging portion 48, the aperture 44** is about 0.5 inch wide and 1.5 inches long.

The width of the slot 52 in the insert depends on the thickness of the cutting blade 22, and on the quality of cut deemed acceptable. For a cutting blade 22 having a width of about 0.083 to 0.095 inch, a slot 52 having a corresponding width of about ⅛ of an inch (0.125 inch), and a length of 1.25 inches is believed suitable. A better cut results if the slot 52 is sized so that the space between the sides the slot, and the adjacent sides of the cutting blade, are less than 3/16 of an inch. If the space is less than 3/32 of an inch, an improved grove 32 is formed. If the space is less than 1/16 of an inch, an even better grove 32 is formed.

Referring to FIGS. 7 and 8, each of the springs 64 exert a force of about 6–7 pounds on the insert 46, for a total force of 12–14 pounds. In the embodiment shown in FIG. 8, the springs deflect a distance of about ⅛ of an inch to produce this force, and contact the retaining portion 50 (FIG. 3) on opposite sides of the slot 52 at about the middle of the length of the retaining portion 50.

Referring to FIG. 6, the ability of the screws 60 and springs 64 to adjust the upward and downward force on the insert 46 helps control undesirable marking of the concrete surface 16 by the insert 46. If the bend areas 38, or the support area 42 (FIG. 2) of skid plate 34 begin to wear thin, then the engaging portion 48 of the insert 46 may extend beyond the bottom surface of the skid plate 34 and begin to dig into the concrete. That could occur because the insert 46 may not wear as quickly as the support area 42 and bend areas 38. By controlling the force with which the insert 46 is held against the support area 42, the insert 46 will not be forced into the concrete surface 16. Thus, it will not be necessary to rely upon the trailing portions of the support area 42 to act as a trowel and smooth out any marks left by the insert 46.

There is thus provided a means for varying the force which the insert 46 exerts on the surface of the concrete being cut so as to reduce the undesirable marking of the concrete surface by the insert 46. Alternatively phrased, there is provided a means for allowing motion of the insert 46 relative to the concrete surface 16 in order to prevent undesirable marking of the concrete surface 16 by the insert 46.

Referring to FIGS. 6–8, the screws 60 and springs 64 provide a means mounted on the base plate 12 of saw 10, for retaining the insert 46 on skid plate 34. If the force between the base plate 12 and skid plate 34 is too great, the skid plate 34 will bow, and produce undesirable marks in the concrete surface 16. The retaining means of FIG. 9 is mounted solely on the skid plate 34, and thus does not cause bowing of the skid plate 34. Coil springs, rubber washers, or other resilient means known in the art and not described in detail herein could be inserted on the screws 68 of FIG. 9 to provide a means for resiliently urging the insert 46 against the skid plate 34.

Although an exemplary embodiment of the invention has been disclosed for purposes of illustration, it will be understood that various changes, modifications and substitutions be incorporated in such embodiment without departing from the spirit of the invention as defined by the claims which follow.

I claim:

1. A skid plate for a saw that is used to cut grooves in concrete with a rotating cutting blade having a predetermined thickness, the skid plate having a leading end, and opposite thereto, a trailing end, with a slot in the skid plate through which the rotating cutting blade can extend, the slot extending from adjacent the leading end toward the trailing end, comprising:

an aperture at the end of the slot in the skid plate nearest the leading edge;

an insert made of a wear resistant material, the insert being insertable into the aperture, the insert having a slot therein the location of which corresponds to the slot in the skid plate when the insert is inserted into the aperture so as to provide a continuation of at least a portion of the slot in the skid plate, the insert being positioned in the skid plate so that a cutting edge of the cutting blade passes through the slot in the insert, the slot in the insert having a first closed end and a second end that opens toward and encompasses the cutting edge of the cutting blade, with the slot extending less than the entire length of the blade; and means for retaining the insert in the aperture as the cutting blade passes through the slot in the insert during operation of the saw.

2. A skid plate as defined in claim 1, wherein the insert is removably insertable into the aperture, and wherein the retaining means removably retains the insert in the aperture.

3. A skid plate as defined in claim 2, wherein the retaining means comprises means on the saw, cooperating with the insert, for retaining the insert in the aperture.

4. A skid plate as defined in claim 3, wherein the skid plate contains a recessed area in the bottom surface of the skid plate, the recessed area joining at least the end of the slot in the skid plate at the trailing end thereof, and extending toward the trailing end of the skid plate until the skid plate no longer contacts the concrete, the width and depth of the recessed area being sufficient to prevent the skid plate from troweling over the groove cut in the concrete by the cutting blade.

5. A skid plate as defined in claim 3, wherein the retaining means further comprises variable resistance means for varying the force with which the insert is held against the concrete in order to affect the marks the insert leaves on the surface of the concrete being cut.

6. A skid plate as defined in claim 5, wherein the insert is made of ceramic.

7. A skid plate as defined in claim 5, wherein the skid plate contains a recessed area in the bottom surface of the skid plate, the recessed area joining at least the end of the slot in the skid plate at the trailing end thereof, and extending toward the trailing end of the skid plate until the skid plate no longer contacts the concrete, the width and depth of the recessed area being sufficient to prevent the skid plate from troweling over the groove cut in the concrete by the cutting blade.

8. A skid plate as defined in claim 7, wherein the retaining means comprises spring means resiliently urging the insert against the skid plate.

9. A skid plate as defined in claim 3, wherein the insert is made of ceramic.

10. A skid plate as defined in claim 2, wherein the retaining means further comprises variable resistance means for varying the force with which the insert is held against the concrete in order to affect the marks the insert leaves on the surface of the concrete being cut.

11. A skid plate as defined in claim 2, wherein the slot in the insert is sized relative to the thickness of the cutting blade so that the space between the slot in the insert and the adjacent sides of the cutting blade is less than 3/16 of an inch.

12. A skid plate as defined in claim 11, wherein the insert is made of ceramic.

13. A skid plate as defined in claim 2, wherein the skid plate contains a recessed area in the bottom surface of the skid plate, the recessed area joining at least the end of the slot in the skid plate at the trailing end thereof, and extending toward the trailing end of the skid plate until the skid plate no longer contains the concrete, the width and depth of the recessed area being sufficient to prevent the skid plate from troweling over the groove cut in the concrete by the cutting blade.

14. A skid plate as defined in claim 13, wherein the insert is made of ceramic.

15. A skid plate as defined in claim 2, wherein the insert is made of ceramic.

16. A skid plate as defined in claim 2, wherein the retaining means comprises spring means resiliently urging the insert against the skid plate.

17. A skid plate as defined in claim 16, wherein at least a portion of the spring means are mounted on the saw.

18. A skid plate as defined in claim 1, wherein the retaining means comprises means on the saw, cooperating with the insert, for retaining the insert in the aperture.

19. A skid plate as defined in claim 1, wherein the slot in the insert is sized relative to the thickness of the cutting blade so that the space between the slot in the insert and the adjacent sides of the cutting blade is less than 3/16 of an inch.

20. A skid plate as defined in claim 1, wherein the skid plate contains a recessed area in the bottom surface of the skid plate, the recessed area joining at least the end of the slot in the skid plate at the trailing end thereof, and extending toward the trailing end of the skid plate until the skid plate no longer contacts the concrete, the width and depth of the recessed area being sufficient to prevent the skid plate from troweling over the groove cut in the concrete by the cutting blade.

21. A skid plate as defined in claim 1, wherein the insert is made of ceramic.

22. A skid plate as defined in claim 1, wherein the slot in the insert is long enough to encompass an area of greatest wear on the cutting blade when the blade extends through the slot in the insert, which area of wear is about one half inch past the cutting edge of the blade.

23. A skid plate as defined in claim 1, wherein the slot in the insert continues the slot in the skid plate by forming a slot of substantially constant width.

24. A skid plate for a saw that is used to cut grooves in concrete with a rotating cutting blade having a predetermined thickness, the skid plate having a leading end, and opposite thereto, a trailing end, with a slot in the skid plate through which the rotating cutting blade can extend, the slot extending from adjacent the leading end toward the trailing end, comprising:

an aperture at the end of the slot in the skid plate nearest the leading edge;

an ceramic insert made of a wear resistant material, the insert having an engaging portion configured to fit into and be supported by the aperture in the skid plate, the insert having a retaining portion configured to prevent passage of the insert through the aperture, the insert having a slot therein located so as to coincide with the slot in the skid plate, the slot in the insert being sized to allow passage of the cutting blade through the slot, the insert and aperture being positioned in the skid plate so that a cutting edge of the cutting blade passes through the slot in the insert, the slot in the insert having a first closed end and a second end that opens toward and encompasses the cutting edge of the cutting blade, with the slot extending less than the entire length of the blade; and means for retaining the insert in the aperture as the cutting blade passes through the slot in the insert during use of the saw in cutting concrete.

25. A skid plate as defined in claim 24, wherein the retaining means comprises spring means resiliently urging the insert against the skid plate.

26. A skid plate as defined in claim 25, wherein the retaining means is adjustable so as to allow the force on the insert to be adjusted to vary the force with which the insert contacts the concrete surface being cut by the saw.

27. A skid plate as defined in claim 25, wherein at least a portion of the retaining means is mounted on the saw.

28. A skid plate as defined in claim 24, wherein the skid plate further contains a recessed area in the bottom of the skid plate, the recessed area engaging at least the trailing end of the slot in the skid plate and extending toward the trailing edge of the skid plate, the recessed area being of sufficient depth, width, and length that the skid plate does not damage the groove after it has been cut.

29. A skid plate as defined in claim 24, wherein the slot in the insert is long enough to encompass an area of greatest wear on the cutting blade when the blade extends through the slot in the insert, which area of wear is about one half inch past the cutting edge of the blade.

30. A skid plate as defined in claim 24, wherein the slot in the insert continues the slot in the skid plate by forming a slot of substantially constant width.

31. An insert for use with a skid plate on a saw having a rotating blade with a cutting edge used to cut concrete, the skid plate having a longitudinal slot therein with an aperture at a leading end of the slot, comprising:

a wear resistant ceramic insert having an engaging portion configured to correspond to the shape of the aperture in the skid plate;

a retaining portion attached to the engaging portion, the retaining portion having a shape not corresponding to the shape of the aperture to prevent the insert from passing through the aperture when the engaging portion is placed in the aperture; and a slot in at least the engaging portion, positioned to corresponding with at least a portion of the slot in the skid plate when the engaging portion is inserted into the aperture, the slot in the insert having a first closed end and a second end that opens toward and encompasses the cutting edge of the rotating blade, with the slot extending less than the entire length of the blade.

32. An insert as defined in claim 31, wherein the slot in the insert has a width of less than or equal to 0.125 inch.

33. An insert as defined in claim 31, wherein the slot has a width such that when a concrete saw blade is inserted into the slot, there is a gap on each side of the saw blade of less than 3/16 of an inch.

34. An insert as defined in claim 31, wherein the slot has a width such that when a concrete saw blade is inserted into the slot, there is a gap on each side of the saw blade of less than 5/32 of an inch.

35. An insert as defined in claim 31, wherein the slot has a width such that when a concrete saw blade is inserted into the slot, there is a gap on each side of the saw blade of less than 1/16 of an inch.

36. An insert as defined in claim 31, wherein the engaging portion has a generally rectangular shape, and wherein the retaining portion has a generally rectangular shape, the longitudinal axis of each generally rectangular shape being substantially parallel, and wherein the slot in the insert is in a plane passing through the longitudinal axes of each generally rectangular shape.

37. An insert as defined in claim 31, wherein the engaging portion and the retaining portion are integrally formed from a single piece of ceramic.

38. An insert as defined in claim 31, wherein the engaging portion and the retaining portion are integrally formed from a single piece of Ceralloy 147-3 ceramic.

39. An insert as defined in claim 31, wherein the slot in the insert is long enough to encompass an area of greatest wear on the cutting blade when the blade extends through the slot in the insert, which area of wear is about one half inch past the cutting edge of the blade.

40. A skid plate as defined in claim 31, wherein the slot in the insert continues the slot in the skid plate by forming a slot of substantially constant width.

41. A skid plate for a saw having a rotating cutting blade with a thickness, the skid plate having a leading end, and opposite thereto, a trailing end, with a slot in the skid plate through which the rotating cutting blade can extend, the slot extending from adjacent the leading end toward the trailing end, comprising:

an aperture at the end of the slot nearest the leading edge; and an insert made of a wear resistant material, the insert being insertable into the aperture, the insert having a straight slot with one end opening onto a trailing edge of the insert, the slot being located to communicate with at least a portion of the slot in the skid plate when the insert is in the aperture, the insert being positioned in the skid plate so that the cutting edge of the cutting blade passes through the trailing edge of the slot in the insert, the slot extending along less than the entire length of the blade.

42. An insert as defined in claim 41, wherein the slot in the insert is long enough to encompass an area of greatest wear on the cutting blade when the blade extends through the slot in the insert, which area of wear is about one half inch past the cutting edge of the blade.

43. A skid plate as defined in claim 41, wherein the slot in the insert communicates with the slot in the skid plate to form a slot of substantially constant width.

* * * * *